United States Patent [19]

Beiser

[11] Patent Number: 4,936,643

[45] Date of Patent: Jun. 26, 1990

[54] LIGHT SCANNER

[75] Inventor: Leo Beiser, Flushing, N.Y.

[73] Assignee: Leo Beiser Inc., Flushing, N.Y.

[21] Appl. No.: 364,455

[22] Filed: Jun. 9, 1989

[51] Int. Cl.$^5$ ............................................. G02B 26/10
[52] U.S. Cl. .................................................... 350/6.5
[58] Field of Search ............................... 350/6.5–6.91

[56] References Cited

U.S. PATENT DOCUMENTS

| 3,570,189 | 7/1973 | Fleischer | 346/74 |
| 3,619,039 | 11/1971 | Beiser | 350/285 |
| 4,475,787 | 10/1984 | Starkweather | 350/6.4 |
| 4,606,601 | 8/1986 | Starkweather | 350/6.4 |
| 4,796,965 | 1/1989 | Ishikawa | 350/6.5 |

OTHER PUBLICATIONS

Beiser, "Holographic Scanning", J. Wiley & Sons, 1988, pp. 140–143.
Kramer, "Laser Beam Deflector Cost Comparison as a Function of Performance", Holotek, pp. 1,8,9.
Levi, "Applied Optics", J. Wiley & Sons, 1968, cover page and p. 378.

Primary Examiner—Rodney B. Bovernick
Assistant Examiner—Rebecca D. Gass
Attorney, Agent, or Firm—Martin Novack

[57] ABSTRACT

A light scanning system is disclosed which reduces the effects of wobble without the need for complex, cumbersome, or expensive optical equipment. A light source is provided for generating an input light beam. A reflector subsystem receives the input light beam, the subsystem including first and second light-reflective plane surfaces, the planes of which intersect at an obtuse angle. The first light-reflective surface is oriented to receive the input light beam and reflect it toward the second light-reflective surface, and the second light-reflective surface is oriented to further reflect the light beam to be approximately orthogonal the direction of the input light beam. Means are provided for rotating the reflector subsystem on an axis which substantially corresponds to the direction of the input light beam. In a preferred embodiment, the planes of said first and second light-reflective surfaces intersect to include an angle of about 135°. In this embodiment, the axis of rotation of the reflector subsystem forms an angle of about 22.5° with respect to said first light-reflective surface. In a form of the invention, means are provided for focusing said reflector subsystem output beam. The focusing means includes a lens which is operative to focus substantially parallel displaced beams to a single scan line upon rotation of the reflector subsystem.

19 Claims, 2 Drawing Sheets

LIGHT SCANNER

BACKGROUND OF THE INVENTION

This invention relates to light scanners, and, more particularly, to an improved light scanner and light scanning system with wobble correction.

There are various important uses for light scanners which scan a collimated light beam, often a laser beam, in a line pattern across a target. This is commonly achieved by using a rotating optical scanner which repetitively scans the laser beam to produce a line scan. Among the applications for such scanners are copying and facsimile equipment, laser printers, character recognition equipment, and specialized graphics equipment. The accuracy of the scan is generally an important factor in equipment performance. Unfortunately, undesired angular perturbations in the cross-scan direction, called "wobble", result in a scanned line that varies from its intended straight or repetitive path. The wobble can be due to angular differences between multiple elements (e.g. facets) which form the repetitive scans, and/or due to pseudo-random angular shaft errors, often resulting from bearing non-uniformities. Even when the optical scanner is a single-facet device in which periodic differences may be nulled on a once-per-revolution basis, the residual pseudo-random errors can cause significant misplacements of the scan lines in the image area.

There have been various prior art approaches to reducing wobble. One method is the use of anamorphic (usually cylindrical) optics for wobble reduction. This is accomplished by first compressing the height of the illuminating beam incident upon the scanner in the cross-scan direction only (usually with an input cylinder) and then, after the beam is deflected, re-expanding the beam in the cross-scan direction only (usually with an output cylinder) as it propagates through the balance of the system optics, before forming the final focused image. Cross-scan angular error is reduced by the ratio of the beam compression (or re-expansion). For further description, reference can be made to the book by L. Beiser, "*Holographic Scanning*", John Wiley, (1988). However, in the case of the single facet scanner whose mirror is mounted at 45° to the rotating axis while the input beam is paraxial, this correction method fails because the compressed component of illumination is intercepted at different angles as the facet rotates, distorting and skewing its output during scan.

Another technique of wobble reduction utilizes a single linear (transmission) holographic grating mounted to a shaft at 45° such that is acts as a 45° mirror. It reduces cross-scan errors when the input and output beams are related to the grating normal by the Bragg angle (in this case, 45°). In addition to the specialized technology necessary for making such gratings, the angular sensitivity of the gratings at different wavelengths, and the diffraction efficiency sensitivity to different polarization angles during rotation are limiting factors.

U.S. Pat. No.s 4,475,787 and 4,606,601 disclose methods and apparatus for reducing wobble using double reflection. U.S. Pat. 4,475,787 shows a pentaprism or pentamirror mounted to the rotating shaft to act as a monogon (single facet scanner). Double-reflection nulls the cross-scan error; that is, the error of the first reflection is nulled by an equal and opposite second reflection. Limitations of this approach are the significant bulk and unbalanced mass of the penta components, requiring further counter-balancing to achieve stable rotation. Also, the components form a relatively large optical assembly which can impose packaging and cost constraints. A variation described in U.S. Pat. No. 4,606,601 operates also by double reflection; however, only as a right angle roof mirror or prism upon an input beam which is incident normal to the axis.

It is among the objects of this invention to provide a light scanner which reduces wobble, but without the limitations or drawbacks of prior art wobble correction schemes.

SUMMARY OF THE INVENTION

The present invention is directed to a light scanner and a light scanning system which reduces the effect of wobble without the need for complex, cumbersome, or expensive equipment. In accordance with an embodiment of the light scanning system, a light source is provided for generating an input light beam. A reflector subsystem receives the input light beam, the subsystem including first and second light-reflective plane surfaces, the planes of which intersect at an obtuse angle. The first light-reflective surface is oriented to receive the input light beam and reflect it toward the second light-reflective surface, and the second light-reflective surface is oriented to further reflect the light beam to be approximately orthogonal the direction of said input light beam. Means are provided for rotating the reflector subsystem on an axis which substantially corresponds to the direction of the input light beam.

In a preferred embodiment of the invention, the planes of said first and second light-reflective surfaces intersect to include an angle of about 135°. In this embodiment, the axis of rotation of the reflector subsystem forms an angle of about 22.5° with respect to said first light-reflective surface.

In a form of the invention, the light beam reflected from the second light-reflective surface is called the reflector subsystem output beam, and means are provided for focusing said reflector subsystem output beam. The focusing means includes a lens which is operative to focus substantially parallel displaced beams to a single scan line upon rotation of the reflector subsystem.

Further features and advantages of the invention will become more readily apparent from the following detailed description when taken in conjunction with the accompanying drawings.

DESCRIPTION OF THE PREFERRED EMBODIMENT

Figure 1:
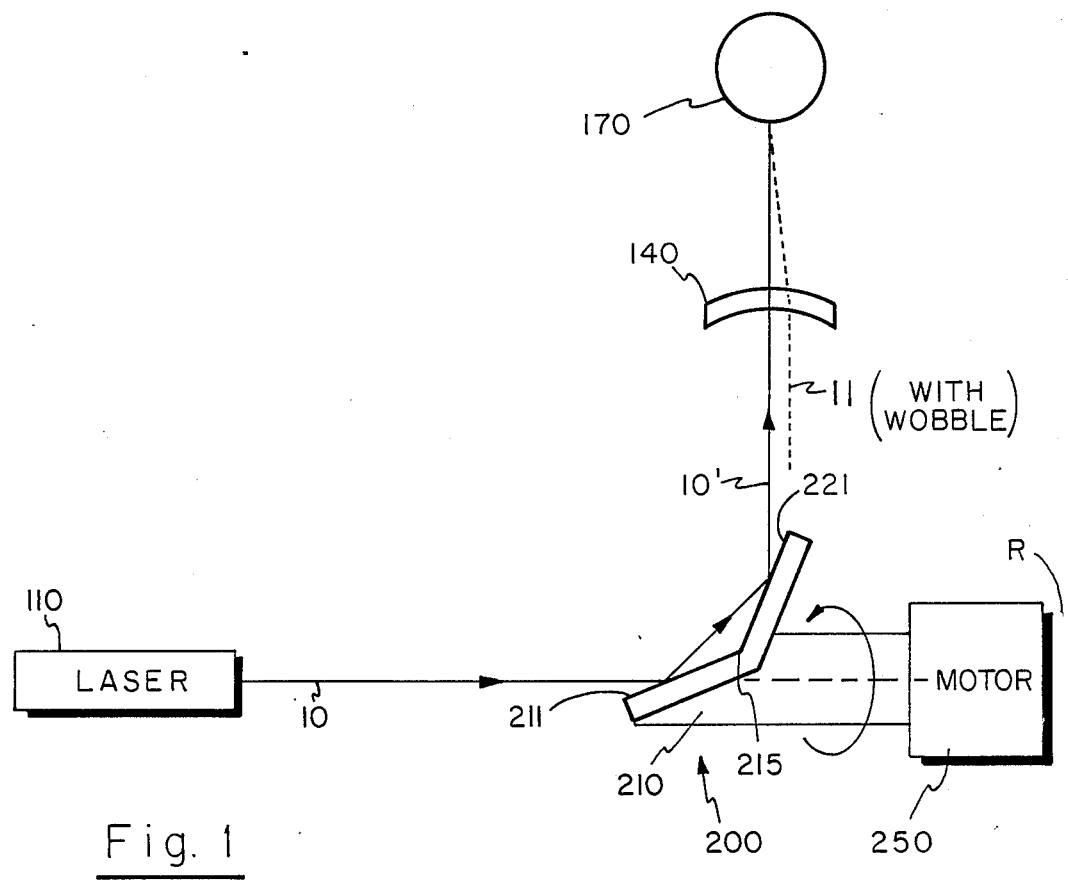
FIG. 1 is a schematic diagram, partially in block form, of a light scanning system in accordance with an embodiment of the invention.

Referring to FIG. 1, there is shown a schematic diagram, partially in block form, of a light scanner system in accordance with an embodiment of the invention. A laser 110, which may have associated optics (not separately shown), produces a coherent light beam 10 that is input to an optical scanner subsystem 200. The beam 10 is preferably collimated and coherent, although the principles of the invention are applicable to non-coherent light beams generated by sources other than lasers. As used herein, the term "light" is intended to generically include visible and near-visible light as well as other radiation having similar optical properties and which can be scanned with moveable optical elements.

Figure 2:
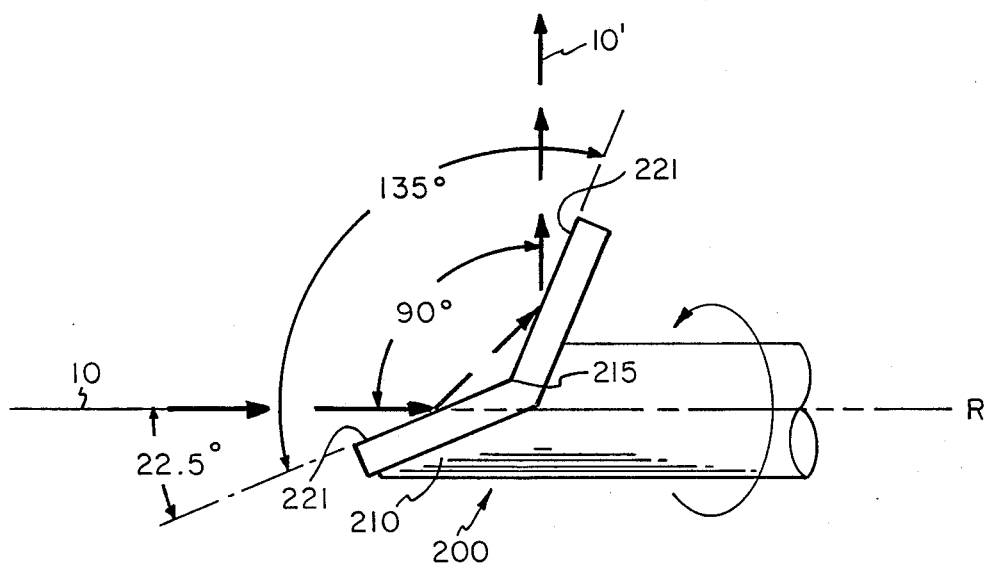
FIG. 2 shows the reflector subsystem of the FIG. 1 system, and illustrates operation thereof.
Figure 3:
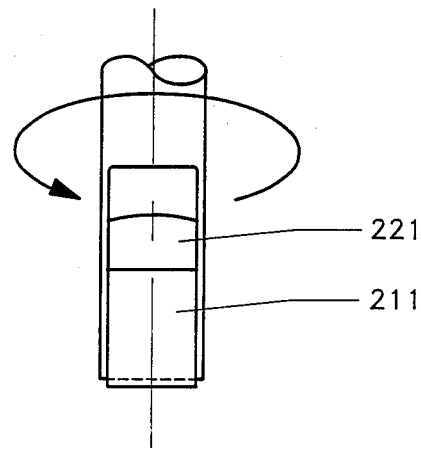
FIG. 3 is a top view of the reflector subsystem of FIG. 2.
Figure 4:
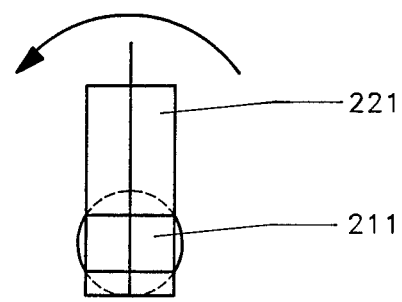
FIG. 4 is a front view of the reflector subsystem of FIG. 2.

The reflector subsystem, which is illustrated in further detail in FIGS. 2, 3 and 4, includes two plane mirrors, 211 and 221 which are mounted on a base 210 and meet at a vertex 215 to form a nominal included angle of 135°. In the illustrated embodiment, and as best seen in FIG. 2, mirror 211 is oriented at an angle of 22.5° with respect to the axis of rotation (dashed line R of the reflector subsystem). A motor 250 is utilized in the present embodiment to rotate the reflector subsystem on the axis R. Preferably, the input beam is substantially coincident with (typically, paraxial with) the rotation axis R. As seen in FIGS. 1 and 2, for example, the input beam 10 reflects off mirror 211 toward mirror 221, and then reflects off mirror 221. The beam exiting the reflector subsystem is called the reflector subsystem output beam and is designated 10'. The reflector subsystem output beam 10' is seen to exit at an angle of 90° from the axis R. Because of the double reflection and the 135° nominal included angle, the exiting beam is stabilized at this angle of 90° from the axis, independent of small variations in the orientation of the mirror pair with respect to the rotation axis (i.e. variation in the 22.5° angle). Thus, the 22.5° typical angle may be set at any convenient angle, and upon varying dynamically by any erroneous angle (e.g. during scanning rotation about the axis), that output beam 10' will remain directed 90° from the input beam.

In the embodiment of FIG. 1, the output beam 10' passes through focusing lens 140 and impinges on target 170. The target 170 may be, for example, a drum having its axis perpendicular to the plane of the paper. In operation of the embodiment of the light scanning system of FIG. 1, as the reflector subsystem is rotated, the output beam 10' will scan lines on the target in the plane perpendicular to the plane of the paper.

Figure 5:
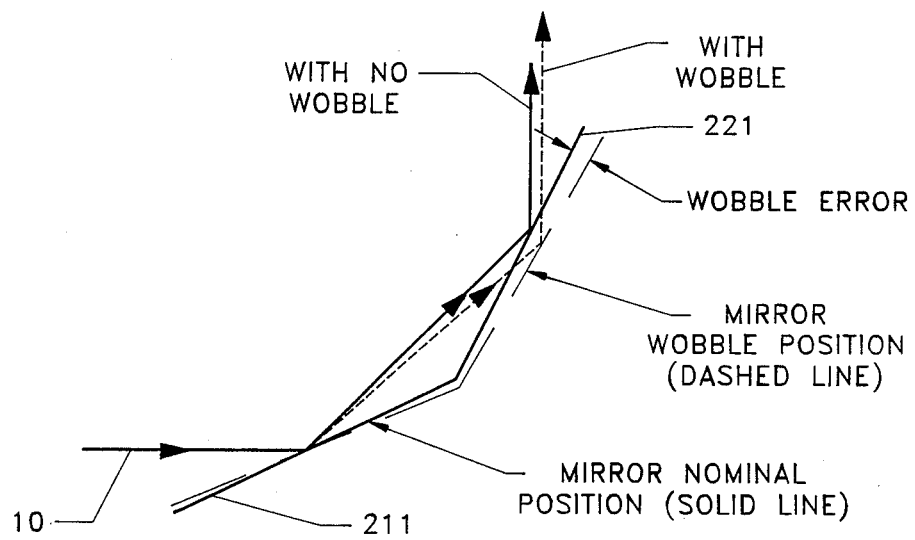
FIG. 5 is a diagram which illustrates the wobble correcting operation of the disclosed embodiment.

FIG. 5 illustrates the wobble correction that results from the double reflection of the described embodiment. The solid line mirrors and solid line beam represents the no-wobble situation. The broken line version of the mirror shows the mirror position for an example of wobble error, and the dashed line beam shows the beam path for the wobble situation. As seen in the diagram, the first reflection (from mirror 211) result in twice the angular change of the mirrors due to the wobble. Upon reflection from the second mirror (215, with the wobble error) the original output direction is restored, and it is seen that the beam with wobble (dashed line) is parallel to the beam without wobble. The lens 140 can then operate to focus the beam to its originally desired position, as illustrated by the exaggerated dotted line 11 in FIG. 1. The concept of correction with double reflection is known in the art, but the present invention achieves this double reflection with a structure that is simpler, less cumbersome, better balanced, and less expensive than prior art structures.

The invention has been described with reference to a particular preferred embodiment, but variations within the spirit and scope of the invention will occur to those skilled in the art. For example, it will be understood that further optical elements can be employed that are either attached to or separate from the rotating reflective subsystem. In this regard, a lens could be mounted in conjunction with the reflective subsystem to focus the exiting beam in desired fashion. Further, if it is desired to have the scan at an angle other than 90° with respect to the input beam, the angle between the reflective surfaces can be varied from the nominal 135° angle.

I claim:

1. A light scanner for scanning an input light beam and which reduces the effects of wobble on cross-scan scanning error, comprising:

a reflector subsystem including first and second light-reflective plane surfaces, the planes of which intersect at an obtuse angle, said first light-reflective surface being oriented to receive said input light beam and reflect said beam toward said second light-reflective surface, and said second light-reflective surface being oriented to further reflect said light beam to be approximately orthogonal the direction of said input light beam; and means for rotating said reflector subsystem on an axis which substantially corresponds to the direction of the input light beam.

2. The light scanner as defined by claim 1, wherein the planes of said first and second light-reflective surfaces intersect to include an angle of about 135°.

3. The light scanner as defined by claim 2, wherein said means for rotating said reflector subsystem comprises a motor.

4. The light scanner as defined by claim 2, wherein said axis of rotation forms an angle of about 22.5° with respect to said first light-reflective surface.

5. The light scanner as defined by claim 4, wherein said means for rotating said reflector subsystem comprises a motor.

6. The light scanner as defined by claim 1, wherein said axis of rotation forms an angle of about 22.5° with respect to said first light-reflective surface.

7. A light scanning system, comprising:

a light source for generating an input light beam;

a reflector subsystem for receiving said input light beam and including first and second light-reflective plane surfaces, the planes of which intersect at an obtuse angle, said first light-reflective surface being oriented to receive said input light beam and reflect said beam toward said second light-reflective surface, and said second lightreflective surface being oriented to further reflect said light beam to be approximately orthogonal the direction of said input light beam; and means for rotating said reflector subsystem on an axis which substantially corresponds to the direction of the input light beam.

8. The light scanning system as defined by claim 7, wherein the light beam reflected from the second lightreflective surface is the reflector subsystem output beam, and further comprising focusing means for focusing said reflector subsystem output beam.

9. The light scanning system as defined by claim 8, wherein said focusing means includes a lens which is operative to focus substantially parallel displaced beams to a single scan line upon rotation of the reflector subsystem.

10. The light scanning system as defined by claim 8, wherein the planes of said first and second light-reflective surfaces intersect to include an angle of about 135°.

11. The light scanning system as defined by claim 8, wherein said axis of rotation forms an angle of about 22.5° with respect to said first light-reflective surface.

12. The light scanning system as defined by claim 11, wherein said means for rotating said reflector subsystem comprises a motor.

13. The light scanning system as defined by claim 9, wherein the planes of said first and second light-reflective surfaces intersect to include an angle of about 135°.

14. The light scanning system as defined by claim 9, wherein said axis of rotation forms an angle of about 22.5° with respect to said first light-reflective surface.

15. The light scanning system as defined by claim 7, wherein the planes of said first and second light-reflective surfaces intersect to include an angle of about 135°.

16. The light scanning system as defined by claim 15, wherein said axis of rotation forms an angle of about 22.5° with respect to said first light-reflective surface.

17. The light scanning system as defined by claim 15, wherein said means for rotating said reflector subsystem comprises a motor.

18. The light scanning system as defined by claim 7, wherein said axis of rotation forms an angle of about 22.5° with respect to said first light-reflective surface.

19. The light scanning system as defined by claim 7, wherein said means for rotating said reflector subsystem comprises a motor.

* * * * *